Sept. 3, 1968   W. W. PORTER   3,399,520
HARVESTER

Filed Dec. 2, 1963   7 Sheets-Sheet 1

FIG 1

INVENTOR.
WELLINGTON W. PORTER

ATTORNEY

Sept. 3, 1968   W. W. PORTER   3,399,520
HARVESTER

Filed Dec. 2, 1963   7 Sheets-Sheet 5

FIG. 5

INVENTOR
WELLINGTON W. PORTER

BY *J.P.Keiper*

ATTORNEY

Sept. 3, 1968 W. W. PORTER 3,399,520
HARVESTER
Filed Dec. 2, 1963 7 Sheets-Sheet 6

INVENTOR.
WELLINGTON W. PORTER,
BY
ATTORNEY

United States Patent Office 3,399,520
Patented Sept. 3, 1968

3,399,520
HARVESTER
Wellington W. Porter, R.D. 2, Waterloo, N.Y. 13165
Filed Dec. 2, 1963, Ser. No. 327,462
10 Claims. (Cl. 56—327)

This invention relates to harvesters and more particularly to a harvester for Brussels sprouts.

In the harvesting of Brussels sprouts, the individual plants comprise a heavy upstanding fibrous stalk covered with miniature cabbage like sprouts. Such stalks grow to a height of eighteen inches or more, and are planted in rows spaced about three feet apart with the individual plants in each row being spaced about eighteen inches. The stalk at the ground level may be as much as an inch and a half in diameter, and is relatively tough, and resists cutting by the sharpest of knives. The individual sprout covered stalks are surrounded by large leaves, which are readily knocked to the ground prior to harvest. However, the cutting of the individual stalks close to the ground and below the sprouts has heretofore been a laborious and time consuming operation. While the stalks may be cut with a circular saw, the severed stem with its sprouts must be protected from bruising or other injury.

The present invention is directed to harvesting apparatus adapted to cut the sprout bearing portion of the stalk from the roots close to the ground, while protecting the severed sprout bearing stalks from bruising or other injury, provision being made for receiving the sprout bearing stalks the instant each is severed from its roots between gathering belts and upon a conveyor which rapidly moves the harvest to a point where the stalks may be readily separated from any loose leaves or other foreign matter that may have been lifted by the cutting mechanism. More particularly the invention has to do with providing a large diameter power circular saw lying in a horizontal plane and the provision of a pair of laterally spaced counter-rotating convex disks, of somewhat lesser diameter than the saw, one of which rotates with and is disposed immediately over the central portion of the saw, and the other of which closely overlies a substantial arcuate portion of the saw periphery and its cutting teeth. The peripheral edges of the disks run immediately adjacent to one another. The second disk in combination with the saw, provided a throat into which the stalk enters while being severed from the roots.

The invention further has to do with the provision of the gathering belts disposed in spaced relation on either side of the stalk cutting area of the saw, such cutting area being the arcuate toothed portion of the saw immediately forward of the peripheral teeth covered by the second disk. Further the invention has to do with the location of the conveyor, with its forward end overlying said disks, and which conveyor together with the gathering belts, promptly removes the cut stalks from the cutting region, protecting the same from the saw, while delivering the harvest to a region remote from the saw for separation of the sprout laden stalks from the leaves and other foreign matter thrown on the conveyor by the action of the saw.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts.

Figure 1:
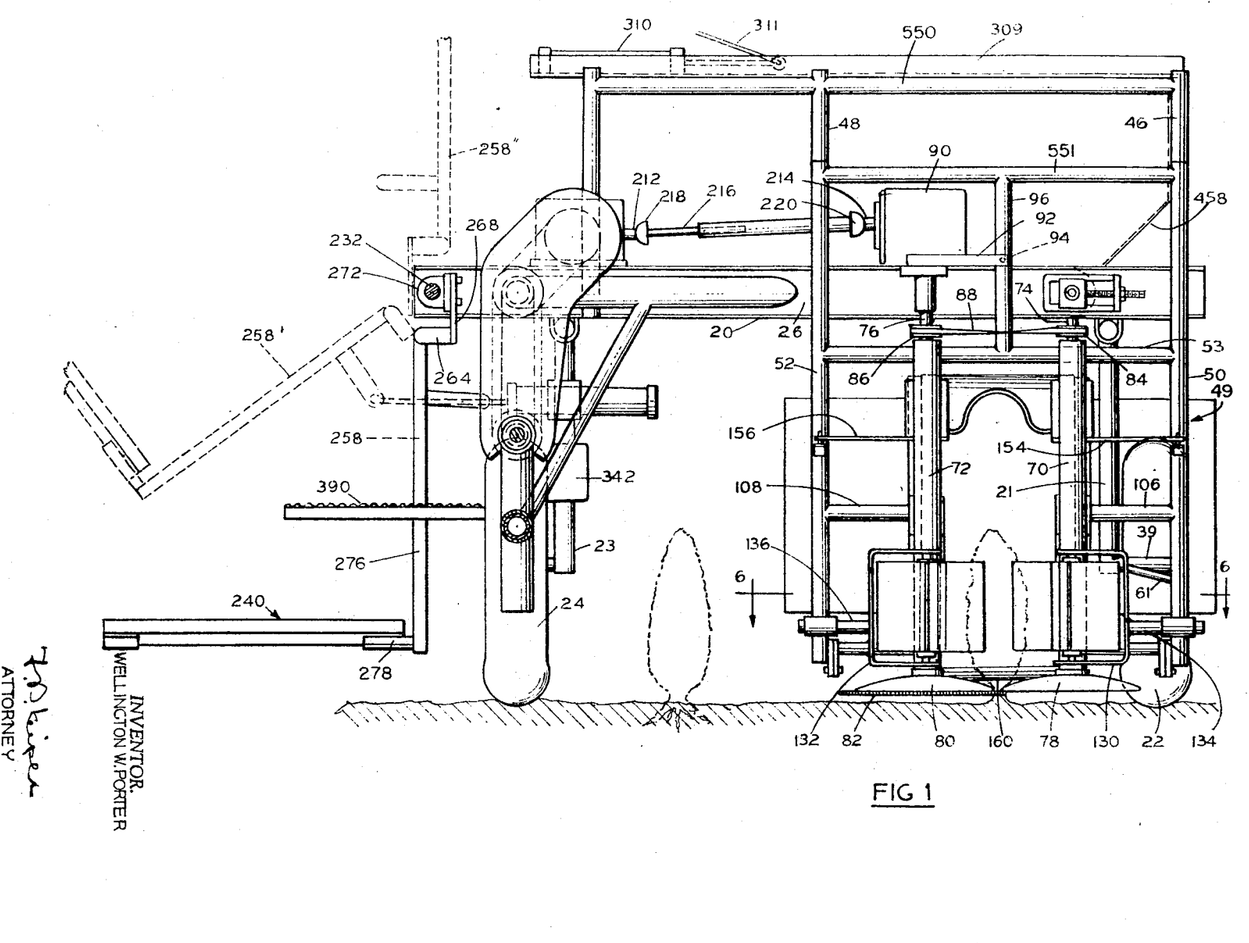
FIGURE 1 is a front elevational view of the harvester.
Figure 2:
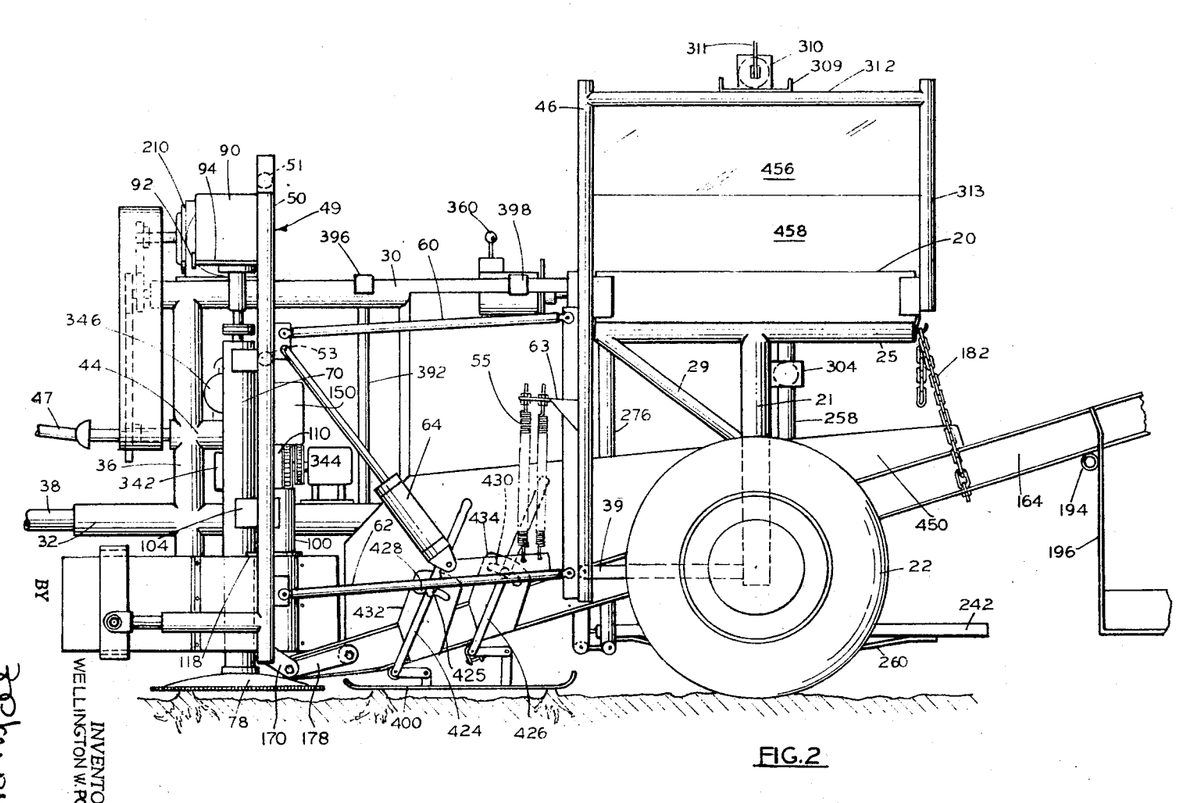
FIGURE 2 is an elevational view from the right hand side.

Referring to the drawings and particularly FIGURES 1 and 2, there is shown a transverse conveyor 20 mounted above spaced ground wheels 22 and 24. The frame of the conveyor and particularly the side channels 26 and 28 form the principle transverse frame structure of the harvester. A heavy tubular fore and aft extending member 30 extends through the conveyor channels 26 and 28 adjacent one end and projects forward of the wheels 22 and 24.

Forward of the wheel 24, and disposed below the member 30 is a second tubular member 32. Vertical tubular members 33, 34, 35 and 36 welded to the members 30 and 32, provide a rigid frame, and the forward end of the member 32 is provided with a draw bar 38 adapted to be coupled to a tractor vehicle, which provides support therefor. Rectangular side plates 40 and 41, welded to the opposite sides of members 30, 32, 33 and 34 rigidify the frame thus provided, and form together with the members 30 and 32, 33 and 34, an oil reservoir 42 for supplying hydraulically operated apparatus as will hereinafter appear. The members 35 and 36 are interrupted by a short tubular member 44 disposed above the member 32. A shaft 43 is journalled in member 44 on spaced bearings (not shown), and its forward end is provided with a universal connection 45 to a drive shaft 47, adapted to be driven by the motive power of the tractor vehicle.

On the front side of the right hand end of the conveyor frame, and particularly to the channel 26 thereof, are affixed spaced tubular uprights 46 and 48, which extend below and above the side channel 26, the upright 46 being disposed adjacent one end of the channel 26, while the upright 48 is disposed somewhat centrally thereof. The uprights are tied together at their upper end above the conveyor by a tubular member 550, which extends to a tubular upright 552 affixed to the channel 26 near the discharge end of the conveyor 20. The wheels 22 and 24 are mounted on short stub axles projecting laterally from vertical tubular legs 21 and 23, which are affixed at their upper ends to fore and aft extending tubular members 25 and 27 fixed to the underside of the conveyor frame members 26 and 28. Diagonal braces 29 extending from the members 25 and 27 to the wheel legs 21 and 23 are provided.

The tubular uprights 46 and 48 extend downwardly to the approximate level of the wheel centers, and upright 46 is provided with a horizontally disposed L member 39, extending inwardly from the lower end of upright 46, and rearwardly to the lower end of the wheel support leg 21. The spacing between the wheels corresponds to approximately double the spacing between adjacent rows of sprouts, which in practice may be a matter of about three feet.

Directly forward of the uprights 46 and 48, is a cutter head frame 49 comprising spaced tubular uprights 50 and 52 rigidly connected together by lateral members 51 and 53. The frame 49 is connected to the uprights 46 and 48 by two pairs of upper and lower parallel links 60 and 62 pivotally attached at their ends to the uprights 46 and 50, and 48 and 52 respectively. A link 61 extending from the upright 50 angularly to the L member 39, prevents lateral sway of the frame 49. The weight of the head frame 49 is counter balanced at least in part by tension springs 55 extending from the lower links 62 to brackets 63 on the uprights 46 and 48, and the elevation and transverse inclination of the head frame 49 may be set in relation to the transverse conveyor through actuation of the oil cylinders and pistons 64 and 65, which comprise extensible struts extending diagonally from the links 62 to the uprights 50 and 52 of the head frame member. In many respects the parallelogram structure including links 60 and 62 is similar to that shown in Patents No. 2,729,049 and Nos. 2,674,838 and 2,614,379, and the forward frame 49 may be held, raised, lowered, or tilted laterally with respect to the conveyor 20 by operator control over the admission of hydraulic oil under pressure to the opposite sides of the pistons of the cylinder and pistons 64 and 65.

Mounted on the front side of the cutter head frame are two vertical tubes 70 and 72 affixed at their upper ends to the member 53, such tubes being laterally spaced about sixteen and a half inches on centers, and each forming a bearing housing for vertical shafts 74 and 76 journalled in upper and lower bearings disposed within the tubes (not shown). The lower ends of the shafts which project from the tubes 70 and 72 have affixed thereto convex or dished circular disks 78 and 80, of a diameter of approximately sixteen inches. Immediately beneath the disk 80, and steadied by it, is a circular saw 82 of approximately twenty inches in diameter, and the same is affixed to the lower end of the shaft 76. The teeth of the saw run beneath disk 78, sufficient clearance as is necessary being provided. The upper ends of the shafts 74 and 76 project above the ends of the bearing tubes 70 and 72 and are each provided with a pulley 84 and 86. Reverse drive of shaft 74 from shaft 76 is effected by a crossed belt 88, and the upper end of shaft 76 is coupled to the outlet shaft of a miter gear box 90. The shaft 76 supports the gear box. A torque arm 92 and link 94 extending to the vertical frame member 96 extending between bars 51 and 53 resists the reaction torque of the gear box 90.

Immediately behind the bearing tubes 70 and 72 are short bearing tubes 100 and 102, the same being affixed to the tubes 70 and 72 by plates 104, and the outside plates 104 are connected to the uprights 50 and 52 by tubular members 106 and 108, which serve to rigidify the bearing tubes 70 and 72 with respect to the frame 49. Shafts 110 and 112 are journalled in the tubes 100 and 102 on spaced bearings (not shown), and the lower ends of said shafts, immediately below the lower ends of the tubes 100 and 102, are provided with end flanges, 113 and 115 from which extend upwardly, belt drive drums 114 and 116, the latter surrounding the lower ends of the tubes 100 and 102. The upper ends of the drums, which are about ten inches long have annular flanges 118 and 120. The drums 114 and 116 drive the gathering belts 122 and 124 which extend forwardly to idler drums 126 and 128 pivotally mounted in brackets 130 and 132, which are adjustably held forward of the frame 49 by cross arms 134 and 136, clamped in the transverse end sockets of stems 138 and 140, which are in turn clamped in forwardly extending tubular members 142 and 144 affixed to uprights 50 and 52.

The gathering belts are provided with cleats 146 to which flippers 148 of resilient yielding vulcanized canvas belting material are attached, the flippers being of a lateral width of about five inches, and the approximate height of the belts. In practice, about four such flippers may be employed on each belt, with equal spacing.

The upper ends of the shafts 110 and 112 project upwardly from their respective bearing housings or tubes 100 and 102 and each is provided with a hydraulic motor, supported by the respective shafts. The motors 150 and 152 are each provided with torque arms 154 and 156, the ends of which are linked to the frame members or uprights 50 and 52 respectively.

Between the lower flanges 113 and 115 and the gathering belts, and the disks 78 and 80, and as close to the lower ends of the tubes 70 and 72 as is permissible, is disposed the receiving end of an elevator belt 160, the end of which runs on a roll 162, of the least diameter permissible. The roll 162 is journalled between the ends of the elevator side frame members 164 and 166, which frame members are tapered so as to fit within the space provided above the disks 78 and 80, and beneath the gathering belts 122 and 124, and the flanges 113 and 115 of the respective flanged drums 114 and 116.

The forward end of the elevator is supported from the lower ends of the uprights 50 and 52, the uprights 50 and 52 having arms 170 and 172 projecting rearwardly and downwardly which have apertures aligned with the axis of the elevator roll 162. The side members 164 and 166 of the elevator are each provided with laterally projecting arms 174 and 176, and forwardly projecting plates 178 and 180, having apertures therein aligned with the axis of the roll 162, and such plates are bolted to the arms 170 and 172. The elevator extends rearwardly and upwardly underneath the conveyor 20, and the upper rearward end of the elevator and its belt 160 extend a substantial distance behind the conveyor 20. Suitable chains 182 and tance behind the conveyor side members 164 and 166 from the side channel 28 of the conveyor 20. The end roll 186 of the elevator journalled between the conveyor side members 164 and 166, in the usual manner, is provided with a drive shaft projection on which is mounted a hydraulic motor 188, having a torque arm 190, which drives the roll 186.

On opposite sides of the elevator are provided nacelles depending from cross members 192 and 194 affixed to the undersides of the elevator side rails 164 and 166. The nacelles 196 and 198 have flat bottoms 200 and 202 to support sorters, who face one another, and who are thus located in a position to lift from the elevator belt 160, the cut sprout stalks, as they are carried upward along the elevator by the belt 160, the sorters delivering the sprout stalks onto the conveyor 20. Any debris, such as leaves and the like, is carried to the end of the elevator and discharged on the ground.

Mounted above the forward end of frame member 30 is a miter gear box 210, having its output shaft 212 connected to the input shaft 214 of the miter gear box 90, through a splined shaft and sleeve 216, having universals 218 and 220 coupling the shaft and sleeve to the shafts 212 and 214 respectively. The gear box 210 and its input shaft 222 is driven from the shaft 43 by a chain and sprocket drive 224 to a shaft 226 journalled in the tubular member 30, and a chain and sprocket drive 228 from shaft 226 to the miter gear box input shaft 222. The shaft 226 may extend the length of the tubular member 30, and be provided with bearings at the opposite ends (not shown). While such shaft may be used to drive the conveyor 20, or an elevator extending from the conveyor 20, hereinafter to be referred to, but not shown, or both, the conveyor 20 is preferably driven from a hydraulic motor 230, mounted on the end of shaft 232 of the conveyor roll 234. The motor 230 is provided with a torque arm 236 linked to the member 30.

Figures 3, 10:
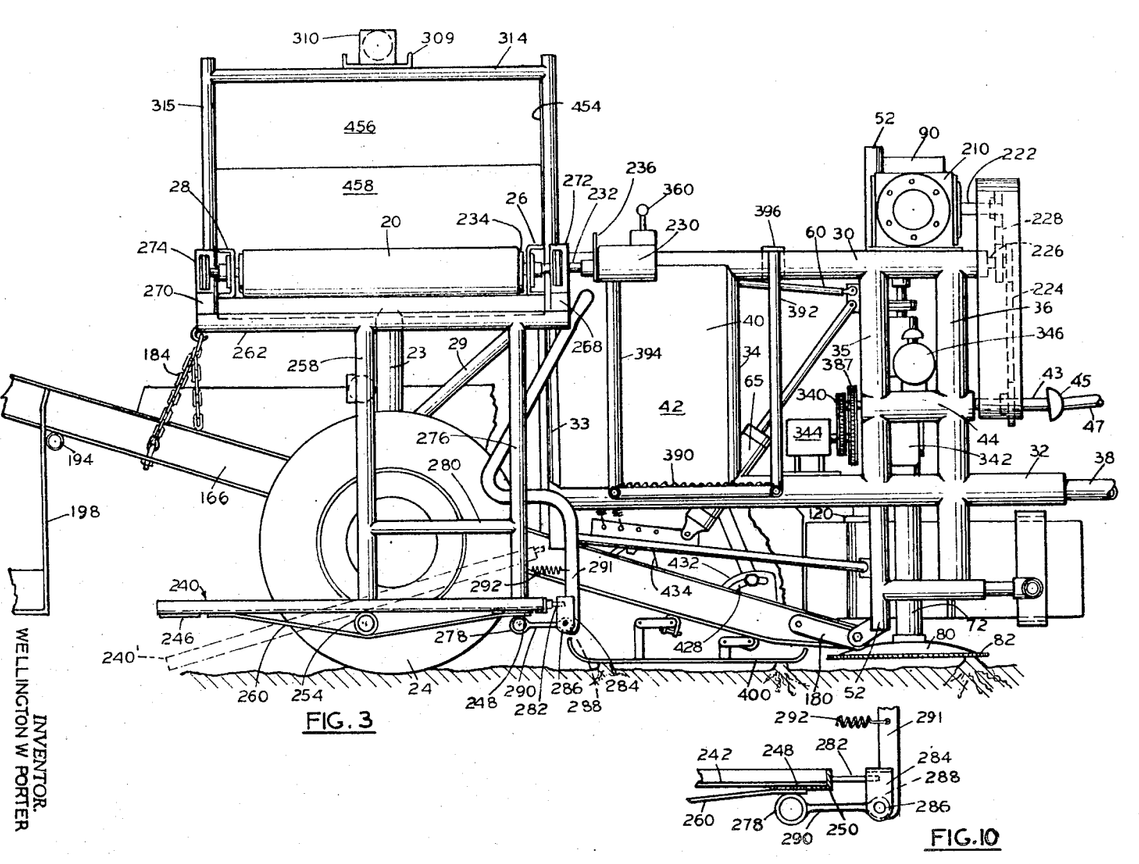
FIGURE 3 is an elevational view from the left hand side.
FIGURE 10 is a fragmentary enlarged detail, partly in section, of the platform lock.
Figure 4:
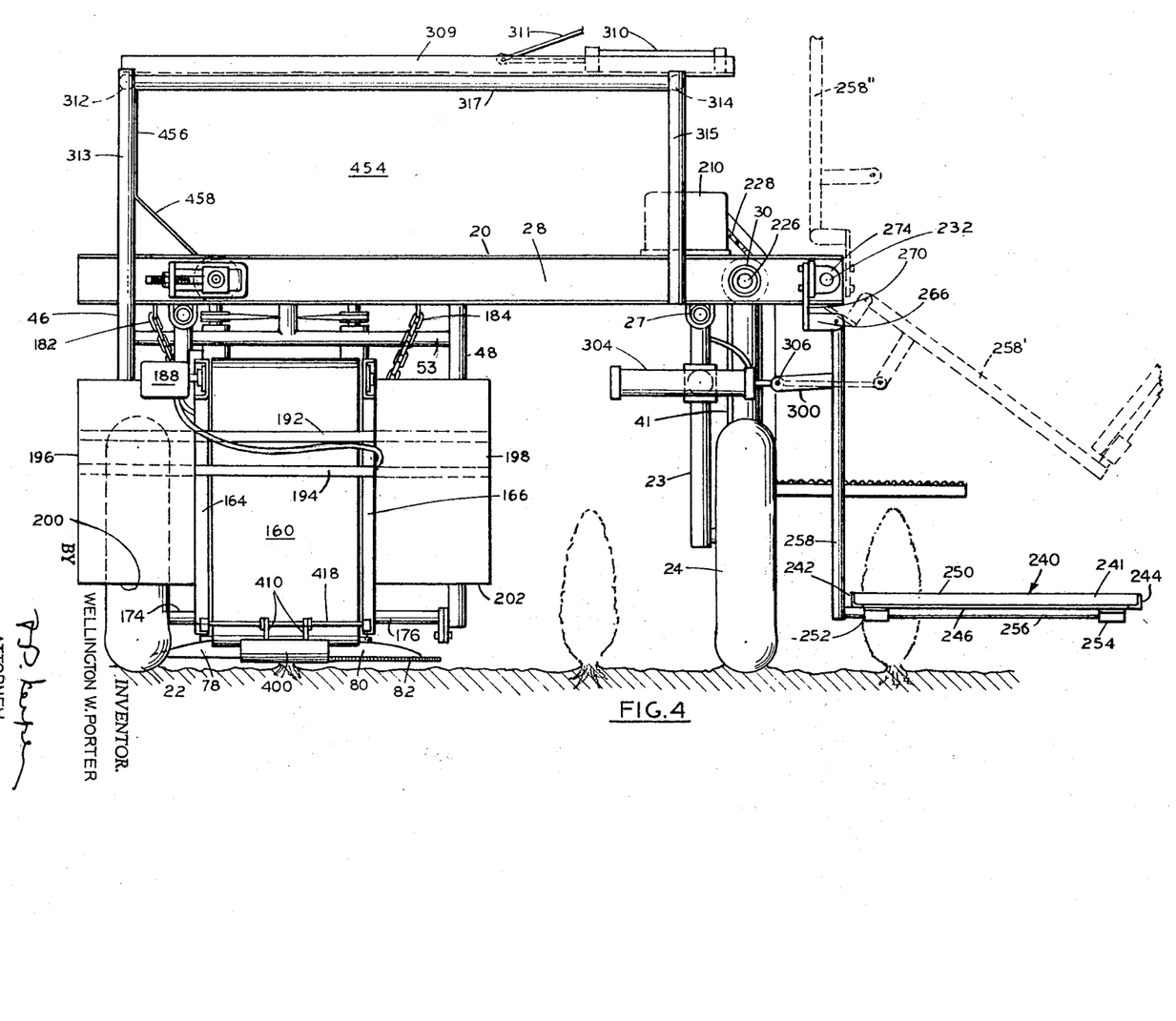
FIGURE 4 is a rear elevational view.
Figure 5:
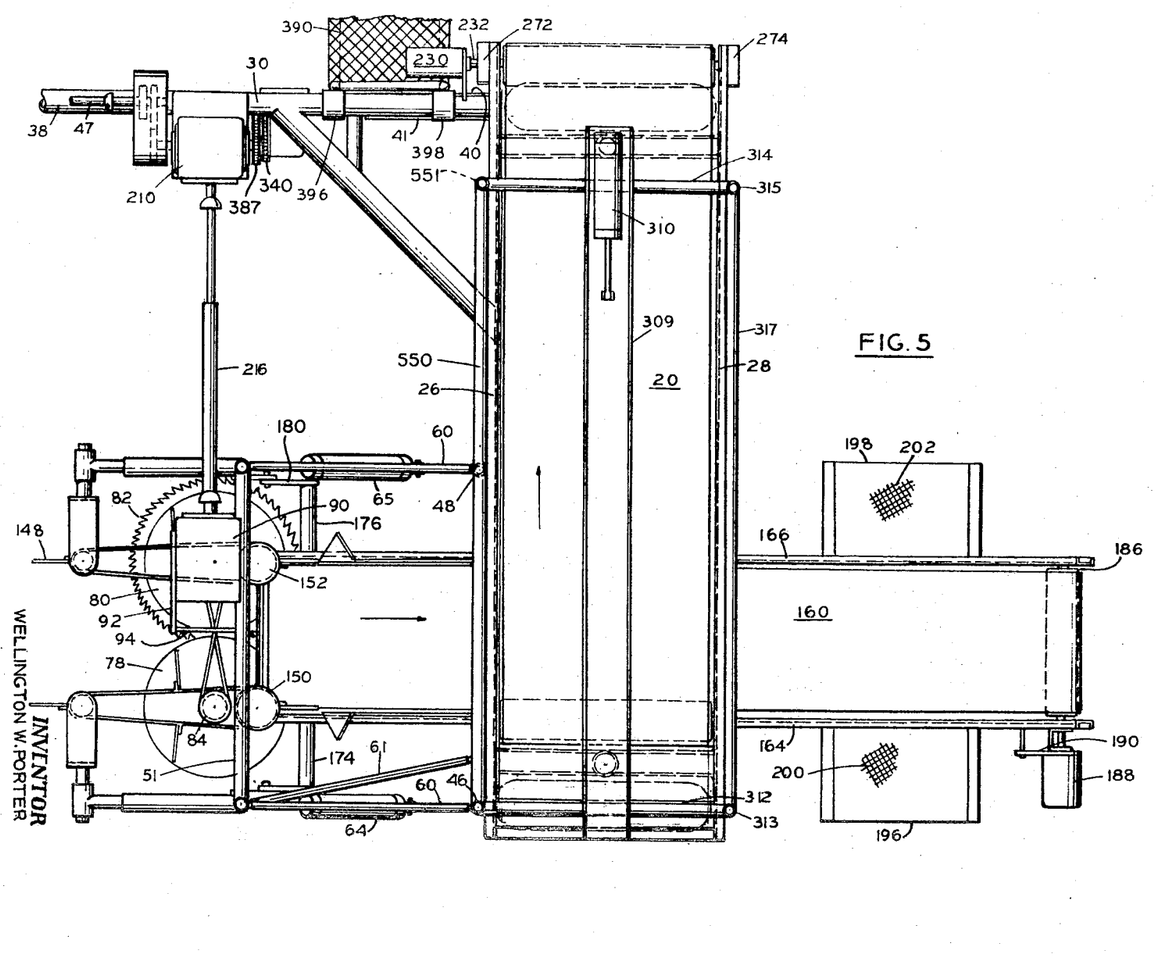
FIGURE 5 is a plan view.
Figure 6:
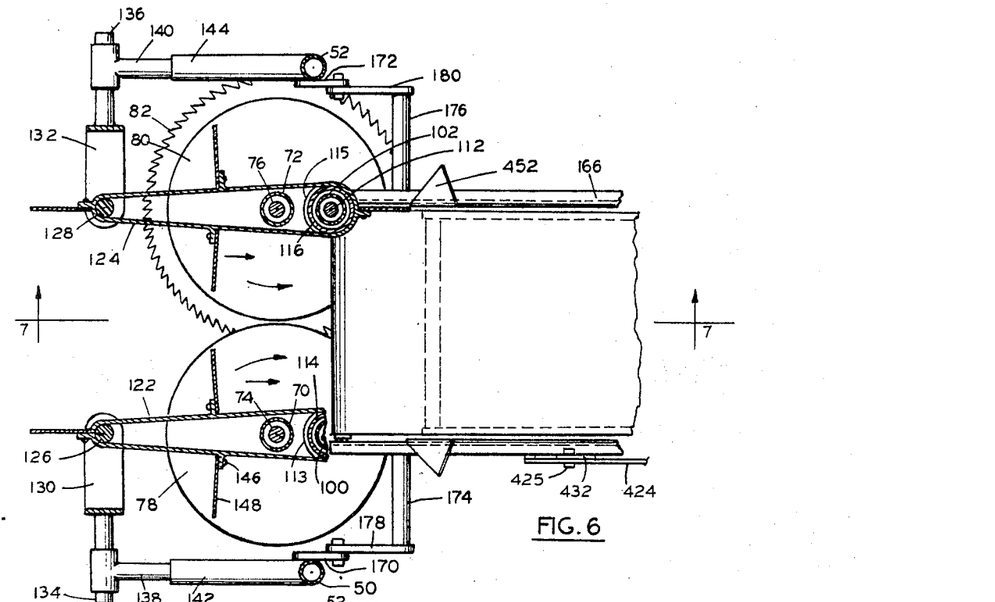
FIGURE 6 is a sectional view taken on the line 6—6 of FIGURE 1 or FIGURE 7.
Figure 7:
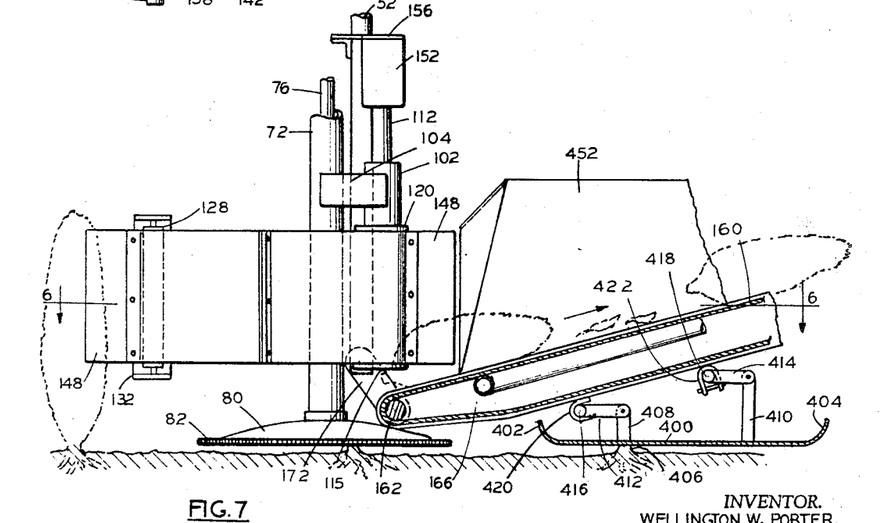
FIGURE 7 is a sectional view taken on the line 7—7 of FIGURE 6.

Mounted below the discharge end of the conveyor 20, is a load receiving crate support platform 240, having spaced bed members 242 and 244 having side flanges, the spacing of which is such as to accommodate a standard pallet bottomed crate. The platform is provided with transverse members 246 and 248, the latter of which is flanged as at 250. Beneath the members 242 and 244, forward of the center to provide slight unbalance, are sleeves 252 and 254, journalled on a tubular bar 256 extending laterally from the lower end of a vertical tubular member 258. The members 242 and 244 are provided with brace members 260 extending beneath the sleeves 252 and 254 as indicated in FIGURE 3. The member 258 is affixed to a tubular member 262, the opposite ends of which are provided with short tubular arms 264 and 266 affixed to plates 268 and 270 respectively, which are in turn affixed to spaced bearing assemblies 272 and 274 on the conveyor drive shaft 232, the shaft 232 serving as a support through the bearings 272 and 274, from which the plates 268 and 270, arms 264 and 266, members 262 and 258 and platform 240 hang.

Affixed to the member 262, is a depending tubular member 276 having a foot 278 extending beneath the conveyor platform and particularly its frame member 242. The member 276 may be braced as at 280 to the members 258. When the forward end of the platform rests upon the foot 278, it is level, and a manually releasable lock is provided to hold the platform level, or on release to permit it to tilt to the position indicated at 240′, to permit a full crate to slide therefrom, or an empty crate to be slid onto the platform. The means for locking the platform level (see FIGURE 10) may comprise a short lug 282 extending forwardly of the flange 250 of transverse member 248, the lug being engaged beneath an inverted U member 284, pivoted on a pintle 286 held in an eye 288 formed in the end of a plate 290 affixed to the foot 278. The U member 284 is affixed to a lever 291, which is normally held in the position shown by a spring 292. Rocking the lever 291 and the U member 284 forward, or clockwise, releases the lug 282 to permit the platform 240, to tilt, for sliding a crate on or off the platform.

The tubular member 258 is provided with a lug 300 connected to the piston 302 of a hydraulic cylinder 304 mounted on the leg 23. Application of oil under pressure to the cylinder swings the member 258, and platform 240 to the position shown at 258′, where the platform is sufficiently high to clear any adjacent rows of Brussels sprouts. In this position a crate carried by the platform may still accept sprout stalks delivered from the conveyor 20. When it is desired to transport the harvester, the pin 306 connecting lug 300 to the piston 302 may be withdrawn, and the platform 240, and its support structure including member 258 may be swung to a position over the conveyor 20, as indicated at 258″. The harvester may be provided with a further endless belt elevator for lifting the discharge from conveyor 20 directly onto a truck traversing the field along side of the harvester. A cylinder and piston 310, for supporting the outboard end of such a conveyor, through a cable is indicated at 311. The cylinder is mounted in a transverse channel member 309 affixed to the transverse members 312 and 314 above the conveyor 20. The members in turn are supported by the members 46 and 551, and uprights 313 and 315 affixed to the conveyor channel 28. The uprights 313 and 315 are joined by a tubular rail 317. In such case, the plates 268 and 270 are detached from the bearing assemblies 272 and 274, the platform 240 and its support members removed, and the lower end of such elevator conveyor substituted and hung from the assemblies 272 and 274.

Figure 8:
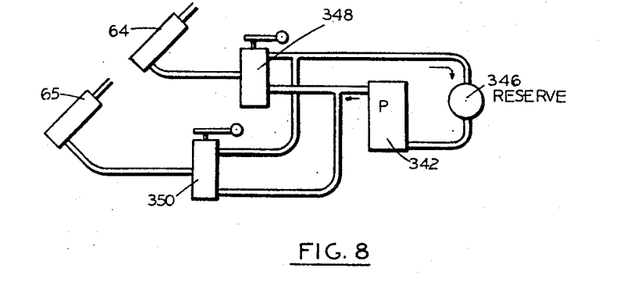
FIGURE 8 is a diagram of an oil pressure control circuit.
Figure 9:
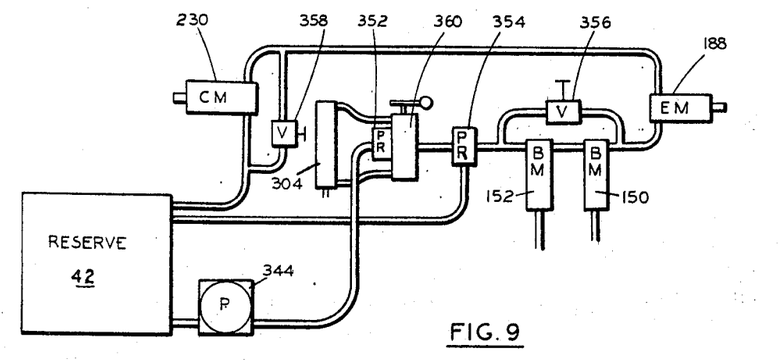
FIGURE 9 is a further diagram of an oil pressure control circuit for driving hydraulic motors.

Driven also from the shaft 43 by chain drives 387 and 340, are high pressure hydraulic pumps 342 and 344 suitably affixed to the frame members 35 and 32 respectively, as indicated in the diagram FIGURE 8. The pump 342 pumps from an oil reservoir 346 mounted on member 44, and supplies, holds, or releases oil under pressure to the strut cylinders 64 and 65 by manual operable valves 348 and 350 as will be understood in the art. As indicated in the diagram FIGURE 9, the pump 344 derives its supply from the reserve reservoir 42, and delivers oil through pressure regulating valves 352 and 354 to drive the hydraulic motors 150 and 152 which are connected in series, and the elevator motor 188 and the conveyor motor 230, all four of which are in series. In order to reduce the speed of the motors 150 and 152 driving the gathering belts, so that the rate of travel of the facing reaches and flippers thereof may be adjusted to correspond substantially to the ground speed of the harvester, a manual valve controlled by-pass 356 is provided. Also in order to stop or control the speed of the conveyor 20, a manual valve controlled by-pass 358 is provided.

Disposed between the regulating valves 352 and 354, is a valve 360 (see FIGURES 2, 3 and 9) for controlling the flow to and from the cylinder 304, for raising or lowering the platform 240. The valve 360 allows oil to flow therethrough to the motors 152 and 150 when in the neutral position, and merely bipasses oil under pressure, when actuated one way or the other from the neutral position to either raise, or lower, the platform 240.

The valves 348, 350, 356 and 358 may be located near valve 360, and a removable platform for an attendant, 390 may be hung from uprights 392 and 394, having hooks 396 and 398 extending over member 30. The platform is readily removed for transport of the harvester on a highway.

If desired there may be provided a skid plate 400 beneath the forward end of the elevator 160, the plate having turned up ends 402 and 404, and being of a length to ride along two stumps of severed sprouts, as indicated at 406. The plate has spaced pairs of upstanding lugs 408 and 410 pivotally attached to spaced pairs of lever arms 412 and 414, affixed to rock shafts 416 and 418 respectively. The rock shaft 416 is journalled in rearwardly facing U brackets 420 affixed to the underside of elevator channels 164 and 166, while the rock shaft 418 is journalled in downwardly facing U brackets 422 also affixed to the underside of elevator channels 164 and 166. The rock shaft ends are provided with levers 424 and 426 respectively which raise or lower the forward and rearward ends of the skid plate to set its height at about the level of the saw cut. The levers are fixed in position when set, by bolts 425 extending through their respective arcuate slots 428 and 430 in plates 432 and 434 affixed to the elevator side channel 164.

The elevator 160 has side walls 450 and 452, extending from just behind the sweep of the flippers 148, and the conveyor 20 is provided with a side wall 454, and an end wall 456, with an inclined lower portion 458.

In order to operate the harvester, the drawbar 38 is coupled to a tractor, which supports the harvester with its frame member 30 approximately level. The drive shaft 47 is coupled to the power take off of the tractor, which provides operating oil pressure through pumps 342 and 344, and drives the circular saw 82 and its disk 80, and the adjacent disk 78. The speed of the gathering belts is adjusted by adjusting by-pass valve 356, so as to operate at a speed commensurate with the forward speed of the harvester, which may be three or more miles per hour. Assuming a pallet crate is on the platform, the conveyor 20 is set in motion, by closing the by-pass valve 358, and the elevator 160 operates at full speed at all times.

The height of the saw 82 is set to cut close to the ground by control of the cylinders 64 and 65, and the skid 400 is adjusted to about the same height. The harvester is then aligned with a row of Brussels sprouts such that the row is midway between the gathering belts 122 and 124. The harvester is then drawn along the row at a speed of three or more miles an hour. The sprout stalks are almost instantly severed by the saw below the sprouts and the stems and sprouts growing thereon are flipped rearwardly by the flippers onto the elevator 160. Sorters standing on the platforms 196 and 198 lift the sprout laden stems onto conveyor 20, which discharges them into a crate on platform 240. Should the crate become full, the conveyor 20 may be stopped, while harvesting continues, since the conveyor 20 can hold a large number of sprouts when thus stopped. When an empty crate is replaced for the loaded crate, the conveyor 20 may be again restarted and any accumulation discharged into the new crate and harvesting continued.

It will be seen that the forward inverted U frame 49 with its spaced vertical shaft housings in which are journalled the oppositely rotating disks, and beneath one of which the circular saw is disposed with its teeth running under the other, provides a cutting throat for the stalks to be cut. While the circular saw 82 is cutting the stalk, the stalk is held against the saw teeth by the peripheral edge of the disk 78, which is rotating in the opposite direction. The convex upper surfaces of the disks tend to elevate the severed stem or stalk and the flippers tend to sweep the cutting area and prevent the stalks from falling in any direction except toward the elevator belt 160, the forward end of which tends to cover the trailing portion of the saw teeth, and prevent the stalks from contact therewith. The combination of the gathering belts, the flippers thereon, the convex disks which tend to boost the cut stalks upwardly, and the close proximity of the elevator, all provide a means for gently receiving the cut sprout stems, while guarding the saw, the harvest being promptly carried up the elevator away from cutting region. The sorters, who are located remotely from the cutting region are thus protected from danger, and may thereby concentrate on the operation of transferring the harvest to the conveyor 20, while the leaves and debris which may also be carried by the elevator belt from the cutting area, are fully discharged from the tail end thereof.

What is claimed is:

1. A Brussels sprouts harvester comprising a frame having laterally spaced ground wheels, an inverted U frame disposed in a plane forward of the axes of said wheels, and supported from said frame, a pair of spaced vertical shafts journalled on said U frame in laterally spaced relation and terminating at their lower ends close to the ground, a circular saw of a diameter greater than the spacing between said shafts affixed to the lower end of one of said shafts, a disk having a diameter slightly less than the spacing between said shafts, and having a convex upper face and affixed to the lower end of the other shaft and having a peripheral portion closely overlying an arcuate portion of said saw, a second like convex disk overlying and coaxial with said saw said last named convex disk having a peripheral portion spaced from the peripheral portion of the first named convex disk so as to engage sprout stems, means for driving said shafts in opposite directions with the adjacent portion of said disks moving rearwardly of the harvester, and means for gathering sprout stems cut by the saw.

2. A Brussels sprouts harvester comprising a frame having laterally spaced ground wheels, an inverted U frame disposed in a plane forward of the axes of said wheels, and supported from said frame, a pair of spaced vertical shafts journalled on said U frame in laterally spaced relation and terminating at their lower ends close to the ground, a circular saw of a diameter greater than the spacing between said shafts affixed to the lower end of one of said shafts, a disk having a diameter slightly less than the spacing between said shafts, and having a convex upper face and affixed to the lower end of the other shaft and having a peripheral portion closely overlying an arcuate portion of said saw, a second like convex disk overlying and coaxial with said saw said last named convex disk having a peripheral portion spaced from the peripheral portion of the first named convex disk so as to engage sprout stems, means for driving said shafts in opposite directions with the adjacent portions of said disks moving rearwardly of the harvester, and means for gathering sprout stems cut by the saw, said means comprising an inclined belt elevator having its forward end supported from said U frame, immediately above the rear portions of said disks, and its rear end supported from said first named frame.

3. A Brussels sprouts harvester comprising a frame having laterally spaced ground wheels, an inverted U frame disposed in a plane forward of the axes of said wheels, and supported from said frame, a pair of spaced vertical shafts journalled on said U frame in laterally spaced relation and terminating at their lower ends close to the ground, a circular saw of a diameter greater than the spacing between said shafts affixed to the lower end of one of said shafts, a disk having a diameter slightly less than the spacing between said shaft and having a convex upper face affixed to the lower end of the other shaft and having a peripheral portion closely overlying an arcuate portion of said saw, a second like disk overlying and coaxial with said saw means for driving said shafts in opposite directions with the adjacent portions of the disks moving rearwardly of the harvester, and means for gathering sprout stems cut by the saw, comprising vertically disposed spaced belts having facing reaches between said shafts and each belt being mounted on vertical axis rollers supported from said U frame and disposed fore and aft of each of said shafts, means for rotating one of the rollers of each of said belts to move said facing reaches rearwardly, a plurality of flexible flippers extending crosswise of the belts, and extending normal therefrom, and an elevator belt conveyor having its forward end disposed behind said shafts and in the space above said disks, and below the rear belt rollers.

4. A harvester for Brussels sprouts and the like comprising a frame having laterally spaced ground wheels, an inverted U frame disposed in a plane forward of the axes of said wheels, and supported from said frame, a pair of spaced vertical shafts journalled on said U frame in laterally spaced relation and terminating at their lower ends close to the ground, a circular saw of a diameter greater than the spacing between said shafts affixed to the lower end of one of said shafts, upwardly convex disks affixed to the lower ends of the shafts immediately above said saw, one of said disks having a peripheral portion closely overlying an arcuate portion of said saw said last named convex disk having a peripheral portion spaced from the peripheral portion of the other convex disk so as to engage sprout stems, means for driving said shafts in opposite directions with the overlying portion of the disk moving rearwardly of the harvester, second vertical shafts disposed behind each of said first named shafts, belt drums on the lower ends of said second shafts, belt drums rotatably mounted from said U frame forward of said first named shafts, laterally spaced belts having transverse and normally disposed flippers running on said drums, and means for driving said first named belt drums in opposite directions to move the facing reaches of said belts in a rearward direction.

5. A harvester for Brussels sprouts and the like comprising a frame having laterally spaced ground wheels, an inverted U frame disposed in a plane forward of the axes of said wheels, and supported from said frame, a pair of spaced vertical shafts journalled on said U frame in laterally spaced relation and terminating at their lower ends close to ground, a circular saw of a diameter greater than the spacing between said shafts affixed to the lower end of one of said shafts, upwardly convex disks affixed to the lower ends of the shafts immediately above said saw, one of said disks having a peripheral portion closely overlying an arcuate portion of said saw, means for driving said shafts in opposite directions with the overlying portion of the disk moving rearwardly of the harvester, second vertical shafts disposed behind each of said first named shafts, belt drums on the lower ends of said second shafts, belt drums rotatably mounted from said U frame forward of said first named shafts, laterally spaced belts having transverse and normally disposed flippers running on said drums, means for driving said first named belt drums in opposite directions to move the facing reaches of said belts in a rearward direction, and an elevator belt having its forward end disposed beneath said first named drums, and above said disks.

6. A harvester for Brussels sprouts and the like growing in rows comprising a frame including a relatively high transversely disposed conveyor, spaced ground engaging support wheels for said frame, an inverted U frame having spaced uprights disposed in a transverse plane forward of said conveyor and having spaced uprights linked to the frame for vertical positioning with respect thereto, a pair of vertical shafts disposed in laterally spaced relation and journalled forwardly of and upon the spaced uprights of said U frame, dished circular disks having convex upper surfaces affixed upon the lower ends of said shafts and lying in a common plane, and adjacent one another, a circular saw having peripheral teeth affixed to the lower end of one of said shafts and of a larger diameter than the disk thereof, with the peripheral teeth of the saw running beneath the other disk, and means for driving said vertical shafts in reverse directions with the saw teeth running beneath the other disk moving rearwardly toward the transverse conveyor frame.

7. A harvester for Brussels sprouts and the like growing in rows comprising a frame including a relatively high transversely disposed conveyor, spaced ground engaging support wheels for said frame, an inverted U frame disposed in a transverse plane forward of said conveyor and linked to the frame for vertical positioning with respect thereto, a pair of vertical shafts disposed in laterally spaced relation and journalled forwardly of and upon the spaced uprights of said U frame, dished circular disks having convex upper surfaces affixed upon the lower ends of said shafts and lying in a common plane, and adjacent one another, a circular saw having peripheral teeth affixed to the lower end of one of said shafts beneath and of a larger diameter than the disk thereof, with the peripheral teeth of the saw running beneath the other disk, and means for driving said vertical shafts in reverse directions with the saw teeth running beneath the other disk moving rearwardly toward the transverse conveyor frame, means for carrying cut sprout stalks from the region of said disks including two gathering belts having spaced flippers extending around each of said shafts and carried on rolls fore and aft of said shafts, and means for driving one of the rolls of each of said belts to move the adjacent reaches of said belts in a rearward direction.

8. A harvester for Brussels sprouts and the like growing in rows, comprising a frame including a relatively high transversely disposed conveyor, spaced ground engaging support wheels for said frame, an inverted U frame disposed in a transverse plane forward of said conveyor and having spaced uprights to the frame for vertical positioning with respect thereto, a pair of vertical shafts disposed in laterally spaced relation and journalled forwardly of and upon the spaced uprights of said U frame, dished circular disks having convex upper surfaces affixed to the lower ends of said shafts and lying substantially in a common plane, and each of a diameter approaching that of the spacing between said shafts, a circular saw having peripheral teeth having a diameter greater than said disks and affixed to the lower end of one of said shafts, beneath the disk thereof, with the peripheral teeth of the saw running beneath the other disk, and means for driving said vertical shafts in reverse directions, with the saw teeth running beneath the other disk moving rearwardly toward the transverse conveyor, an endless belt elevator having its forward end supported from said U frame immediately above said disks and closely behind said shafts and extending rearwardly therefrom beneath said transverse conveyor and terminating behind said transverse conveyor, and two gathering belts extending around each of said shafts and carried on rolls fore and aft of said shafts and disposed immediately above the forward end of said elevator, and means for driving one of the rolls of each of said belts to move the adjacent reaches of said belts in a rearward direction, each of said belts having a plurality of vertically extending resilient flippers affixed thereto transversely thereof adapted to sweep cut sprout stalks toward said elevator.

9. A harvester for Brussels sprouts and the like growing in rows comprising a frame including a relatively high transversely disposed conveyor, spaced ground engaging support wheels for said frame, an inverted U frame having spaced uprights disposed in a transverse plane forward of the receiving end of said conveyor and linked to the frame for vertical positioning with respect thereto, a pair of vertical shafts disposed in laterally spaced relation and journalled forwardly of and upon the spaced uprights of said U frame, dished circular disks having convex upper surfaces affixed to the lower ends of said shafts and lying substantially in a common plane, and adjacent each other, a circular saw having peripheral teeth affixed to the lower end of one of said shafts immediately beneath and of larger diameter than the disk thereof, with the peripheral teeth of the saw running beneath a peripheral portion of the other disk, and means for driving said vertical shafts in reverse directions with the saw teeth running beneath the other disk moving rearwardly toward the transverse conveyor, an endless belt elevator having its forward end supported from said U frame immediately above said disks and closely behind said shafts and extending rearwardly therefrom beneath said transverse conveyor and terminating behind said transverse conveyor, and two gathering belts having spaced flippers extending around each of said shafts and running on rolls fore and aft of said shafts and disposed immediately above the forward end of said elevator, means for driving one of the rolls of each of said belts to move the adjacent reaches of said belts in a rearward direction, and means carried by the discharge end of the conveyor for receiving harvest transferred thereto from said elevator.

10. A harvester for Brussels sprouts and the like growing in rows comprising a frame, spaced ground engaging support wheels for said frame, a pair of vertical shafts disposed in laterally spaced relation and journalled forwardly of and with respect to said frame, dished circular disks having convex upper surfaces affixed upon the lower ends of said shafts and lying in a common plane, and closely adjacent one another, said disks having peripheral portions spaced so as to engage sprout stems, a circular saw affixed to the lower end of one of said shafts beneath and of larger diameter than the disk thereof, with the peripheral teeth of the saw running beneath the other disk, and means for driving said vertical shafts in reverse directions with the saw teeth running beneath the other disk moving rearwardly toward the frame, and means immediately behind said shafts and above said disks for carrying cut sprout stalks rearwardly away from the saw.

References Cited

UNITED STATES PATENTS

| | | | |
|---|---|---|---|
| 2,588,764 | 3/1952 | Richmond | 56—327 |
| 2,380,161 | 7/1945 | Flook | 56—15 |
| 2,514,338 | 7/1950 | Roberts | 56—157 X |
| 2,669,823 | 2/1954 | Kramer | 56—157 X |

FOREIGN PATENTS

| | | |
|---|---|---|
| 26,839 | 1912 | Great Britain. |
| 724,110 | 2/1955 | Great Britain. |
| 900,029 | 7/1962 | Great Britain. |

ABRAHAM G. STONE, *Primary Examiner.*

P. A. RAZZANO, *Assistant Examiner.*